Patented Mar. 3, 1936

2,032,482

UNITED STATES PATENT OFFICE 2,032,482

COMPOSITION FOR CLEANING METAL

Sidney M. Hull, Western Springs, Ill.

No Drawing. Application December 4, 1931,
Serial No. 579,103

3 Claims. (Cl. 87—5)

My invention relates to a new composition of matter designed for use as a detergent, cleaning compound, metal polish, or the like, and is characterized by the incorporation therein of: (1) A substance (or compound) which will dissolve, or be dissolved in, water and organic compounds, such as grease, oil, tar, etc., (2) an emulsifying agent, and (3) an adsorptive material in comminuted form having the capacity of strongly adsorbing liquids and/or material emulsified thereby. If desired, there may also be added to the composition described, certain substances, such as glycerine, essential oil, and/or other compounds, according to the specific purpose for which the composition may be designed.

Accordingly, and in agreement with the order employed above, I prefer to employ: A sulfonated oil, such as sulfonated castor oil (Turkey red oil), sodium oleate, and kieselguhr (infusorial earth), although other compounds or substances, such as sulfonated corn oil, alginic acid (or sodium alginate) and activated charcoal may be employed, either singly, in composition with other products, or together.

In carrying out experimentation on compositions of this nature, and designed for the purposes related above, I have found that my composition has certain properties, distinct from and superior to all other preparations now sold on the market or described in the literature, by reason of: Its substantial freedom from gritty or abrasive substances, its rapid and facile mixing with grease, oil and other organic substances of like nature, its high emulsifying power, its substantial neutrality and consequent freedom from harsh alkaline or acid components, and its marked ability to adsorb substances emulsified thereby.

In compounding my new composition of matter, I dissolve the sulfonated castor oil in an equal weight of water, neutralize the acidity thereof by the addition of a suitable alkali, such as sodium hydroxide, heat the neutralized solution to 70 to 80° C., and add sodium oleate, either in powdered form or as a concentrated solution. The mixture is thoroughly agitated until substantially complete solution or thorough dispersion has taken place, whereupon the hydrogen ion concentration is adjusted to a suitable value, by the addition of small quantities of alkali or acid. Water is then added to give the solution the proper consistency and thereupon finely pulverized kieselguhr (infusorial or diatomaceous earth) is added with constant stirring until a suitable consistency has been attained. If desired, a small quantity of glycerine or an odorant, or both, can be made, prior to the addition of the kieselguhr.

In practice, as illustrative of the composition, I prefer to employ 10-25 parts of sulfonated castor oil, 5-15 parts of sodium oleate, 30-60 parts of kieselguhr, and sufficient water to produce a stiff, pasty consistency. The amount of sodium hydroxide or other alkali employed naturally varies with the degree of sulfonation of the oil and the composition of the emulsifying agent employed.

As an alternative to the form described above, the composition may be produced in the form of a crumbly powder, suitable for use in shaker-top cans or similar receptacle. To produce this form of composition, I prepare a concentrated solution or emulsion of the neutralized sulfonated castor oil, soap and water much in the same way as set forth above, heat it to a nearly boiling temperature, followed by gradual addition of the said solution or emulsion, gradually, and in finely divided form to dry, finely ground kieselguhr which is being vigorously agitated during the addition thereto of the said solution or emulsion. Maintenance of the vogorous agitation at an elevated temperature will then evaporate excess water and gradually reduce the mass to a crumbly, finely divided state. The resulting powder may then be used for the same purposes and in substantially the same manner as the paste form described heretofore.

In either of the forms described above, my composition will mix instantly with oily or greasy material when rubbed on the skin, walls, or other objects coated with grease or oil and forms with the oil, grease, dirt and the like an emulsion which is non-staining to other objects or materials coming in contact therewith. Application of water then results in a rapid mixing of the composition grease, etc., with the water, producing a suspension which shows complete freedom from any and all of the physical properties so characteristic of greasy or oily materials.

Experimentation has shown that my composition has an especial affinity for metallic oxides, sulfides or other metallic compositions ordinarily formed as a film on metal surfaces and that slight rubbing of the tarnished object with the composition in paste form renders the underlying metal completely exposed and free from all traces of the tarnish. This is particularly true of tarnishes which are readily and/or easily formed, such as that produced upon silver. Its neutral reaction and freedom from grit also make my composition highly desirable for the cleaning of painted, lacquered or other finished surfaces, particularly where an oily or greasy film may be present, such as painted kitchen walls, automobile bodies, and the like. In the latter instance, its use both as a detergent and metal polish distinguishes my composition from any other material of similar nature.

While I have set forth the ingredients employed in compounding my composition of matter, and the approximate proportions in which they may be used, as illustrative of the composition, and the manner of its preparation, I do not limit myself to the use of these specific compounds (or substances) since a large number of substances are well known to those skilled in the art for the accomplishing of the respective functions of the ingredients set forth above. Neither do I limit myself to the proportions recited, since these are merely illustrative thereof and may be varied beyond the ranges stated without entire elimination of the properties of the resulting composition. Likewise, the additon of other ingredients beyond those specified cannot serve to increase the essential functions of mutual water and oil solubility, emulsification, and adsorption, and should therefore not be understood to differentiate such compositions from the one here set forth.

What I claim is:

1. A cleaning composition particularly adapted for use on metal surfaces consisting essentially of neutralized sulphonated vegetable oil, 10 to 25 parts; an emulsifying agent of the group consisting of sodium oleate and sodium alginate, 5 to 15 parts; and absorbent of the class consisting of kieselguhr and activated carbon, 30 to 60 parts.

2. A cleaning composition particularly adapted for use on metal surfaces consisting essentially of neutralized sulphonated corn oil, 10 to 25 parts; an emulsifying agent of the griup consisting of sodium oleate and sodium alginate, 5 to 15 parts; and absorbent of the class consisting of kieselguhr and activated carbon, 30 to 60 parts.

3. A cleaning composition particularly adapted for use on metal surfaces consisting essentially of neutralized sulphonated castor oil, 10 to 25 parts; an emulsifying agent of the group consisting of sodium oleate and sodium alginate, 5 to 15 parts; and absorbent of the class consisting of kieselguhr and activated carbon, 30 to 60 parts.

SIDNEY M. HULL.